(12) United States Patent
Dunn

(10) Patent No.: US 8,062,577 B2
(45) Date of Patent: Nov. 22, 2011

(54) ALUMINA TAPHOLE FILL MATERIAL AND METHOD FOR MANUFACTURING

(75) Inventor: Thomas M. Dunn, Hilltop Lakes, TX (US)

(73) Assignees: Edw. C. Levy Co., Detroit, MI (US); Melt Solutions, L.L.C., Hilltop Lakes, TX (US)

( * ) Notice: Subject to any disclaimer, the term of this patent is extended or adjusted under 35 U.S.C. 154(b) by 148 days.

(21) Appl. No.: 12/421,801

(22) Filed: Apr. 10, 2009

(65) Prior Publication Data

US 2010/0261599 A1 Oct. 14, 2010

(51) Int. Cl.
C04B 35/00 (2006.01)

(52) U.S. Cl. ......... 266/45; 266/271; 266/272; 266/273; 423/113

(58) Field of Classification Search .................. 423/113; 209/38; 241/24.1, 24.11, 24.12, 24.13, 24.14, 241/24.15; 428/357
See application file for complete search history.

(56) References Cited

U.S. PATENT DOCUMENTS

| | | | |
|---|---|---|---|
| 3,393,975 A * | 7/1968 | Mitchell et al. | ............... 423/113 |
| 3,607,809 A | 9/1971 | Elby | |
| 4,008,194 A | 2/1977 | Shintani | |
| 4,010,936 A | 3/1977 | Takashima | |
| 4,022,739 A | 5/1977 | Bove | |
| 4,082,718 A | 4/1978 | Ando et al. | |
| 4,261,878 A | 4/1981 | Hirose et al. | |
| 4,292,082 A | 9/1981 | Danjyo et al. | |
| 4,399,982 A | 8/1983 | Henry, Jr. | |
| 4,471,950 A | 9/1984 | LaBate | |
| 4,473,983 A | 10/1984 | Vance | |
| 4,561,885 A | 12/1985 | McFarlane | |
| 4,646,950 A | 3/1987 | Gotoh et al. | |
| 4,792,578 A | 12/1988 | Hughes et al. | |
| 4,836,847 A * | 6/1989 | Bishop et al. | ................... 75/476 |
| 5,045,506 A | 9/1991 | Dube et al. | |
| 5,151,200 A | 9/1992 | Stephansky et al. | |
| 5,167,902 A | 12/1992 | McCray et al. | |
| 5,324,352 A | 6/1994 | Hughes et al. | |
| 5,576,255 A | 11/1996 | Huard et al. | |
| 5,602,192 A | 2/1997 | Yoshida et al. | |
| 5,723,097 A * | 3/1998 | Barnett et al. | ................. 423/111 |
| 5,783,509 A * | 7/1998 | Manier | .......................... 501/97.1 |
| 5,962,357 A | 10/1999 | Kubota et al. | |
| 6,281,266 B1 | 8/2001 | Takeda et al. | |
| 6,299,830 B2 | 10/2001 | Raivo et al. | |
| 6,316,106 B1 | 11/2001 | Takasugi et al. | |
| 6,584,137 B1 * | 6/2003 | Dunn et al. | ................... 373/104 |
| 2007/0027024 A1 | 2/2007 | Ohashi et al. | |
| 2008/0179310 A1 | 7/2008 | Ramey | |

FOREIGN PATENT DOCUMENTS

| | | |
|---|---|---|
| CN | 1290671 | 4/2001 |
| CN | 1650728 A | 10/2006 |
| CN | 1840507 A | 10/2006 |
| EP | 0485919 | 1/1992 |
| JP | 60135511 | 7/1985 |
| JP | 01108170 A2 | 4/1989 |
| JP | 04144975 A2 | 5/1992 |
| JP | 04149073 A2 | 5/1992 |
| JP | 05-339615 * | 12/1993 |
| JP | 08145323 | 6/1996 |
| JP | 09157047 A2 | 6/1997 |
| JP | 11001373 A2 | 1/1999 |
| JP | 2008-105890 * | 5/2008 |
| JP | 2008115065 | 5/2008 |
| KR | 10-1998-0032868 | 7/1998 |
| KR | 10-2001-0052670 | 6/2001 |
| KR | 2049910 | 6/2002 |
| KR | 2049911 | 6/2002 |
| KR | 2049912 | 6/2002 |
| KR | 2050453 | 6/2002 |
| TW | 0583155 | 4/2004 |

OTHER PUBLICATIONS

International Search Report for PCT/US2010/030336 dated Nov. 10, 2010.

* cited by examiner

*Primary Examiner* — Steven Bos

(74) *Attorney, Agent, or Firm* — Honigman Miller Schwartz and Cohn LLP

(57) ABSTRACT

A high-temperature, heat-resistant fill material is disclosed. The high-temperature, heat-resistant fill material includes an alumina refractory waste material having one or more of a used alumina-magnesium-carbon material, a used high-alumina material and a used fused-grain alumina material is disclosed. A method for method for manufacturing a material is also disclosed.

11 Claims, 8 Drawing Sheets

ALUMINA TAPHOLE FILL MATERIAL AND METHOD FOR MANUFACTURING

FIELD OF THE INVENTION

The invention generally relates to a taphole fill material for an electric arc furnace (EAF) and to a method for manufacturing a taphole fill material.

DESCRIPTION OF THE RELATED ART

Taphole fill materials for EAFs are known in the art. Although conventional taphole fill materials have been proven to be useful, such taphole fill materials are nevertheless susceptible to improvements that may enhance or improve the service life and/or performance of an EAF. Therefore, a need exists in the art for the development of an improved taphole fill material.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary embodiment of a novel taphole fill material for an electric arc furnace (EAF) and method for manufacturing the same in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
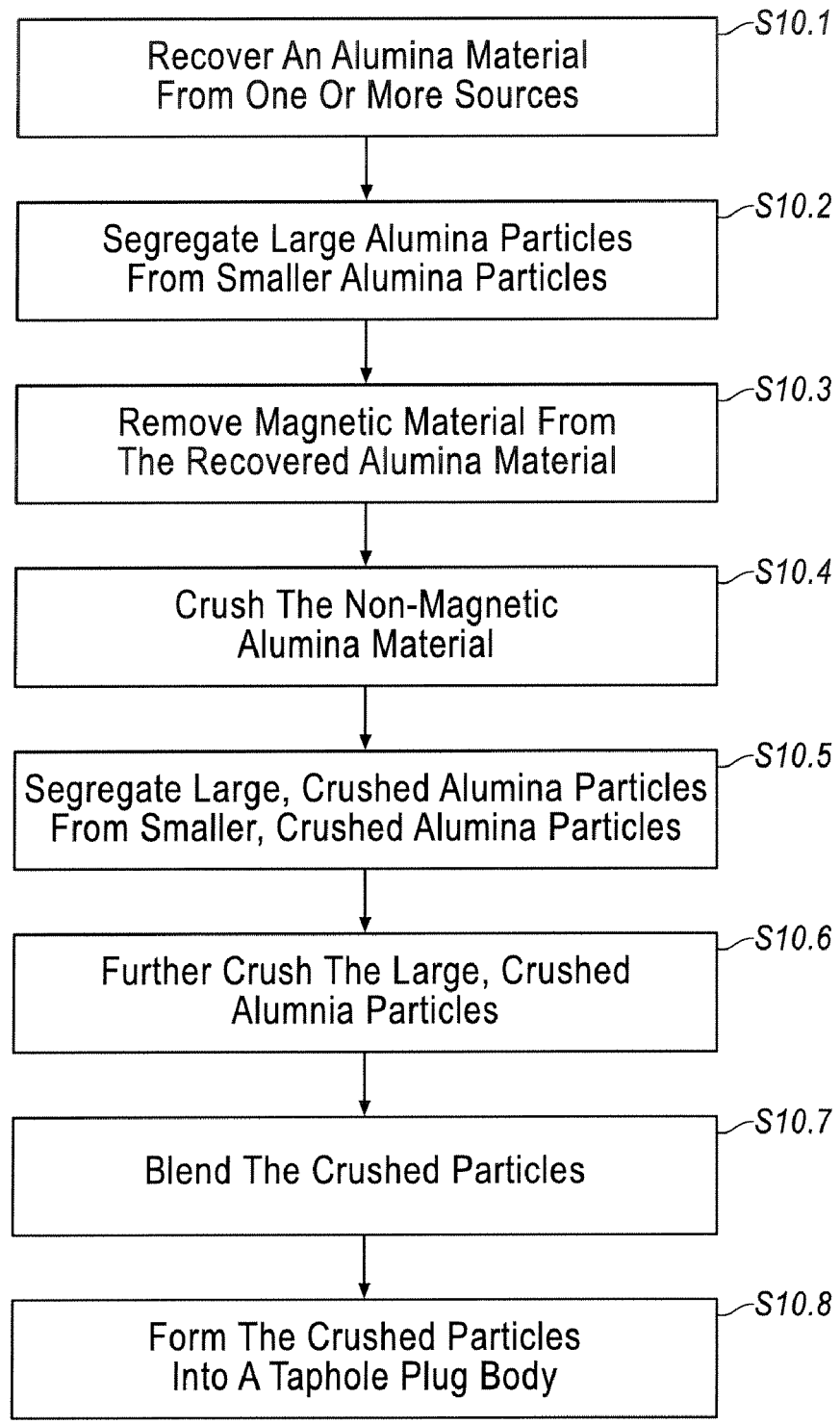
FIG. 1 is a flowchart for a method of manufacturing a taphole fill material in accordance with an embodiment of the invention.

Referring to FIG. 1, a method 10 for manufacturing a high temperature resistant taphole fill material, F (see, e.g., FIG. 3B) is shown according to an embodiment of the invention. In an embodiment, the fill material, F, may be alternatively referred to as "high-temperature grains," a "refractory powder," a refractory sand" or the like.

Figure 2:
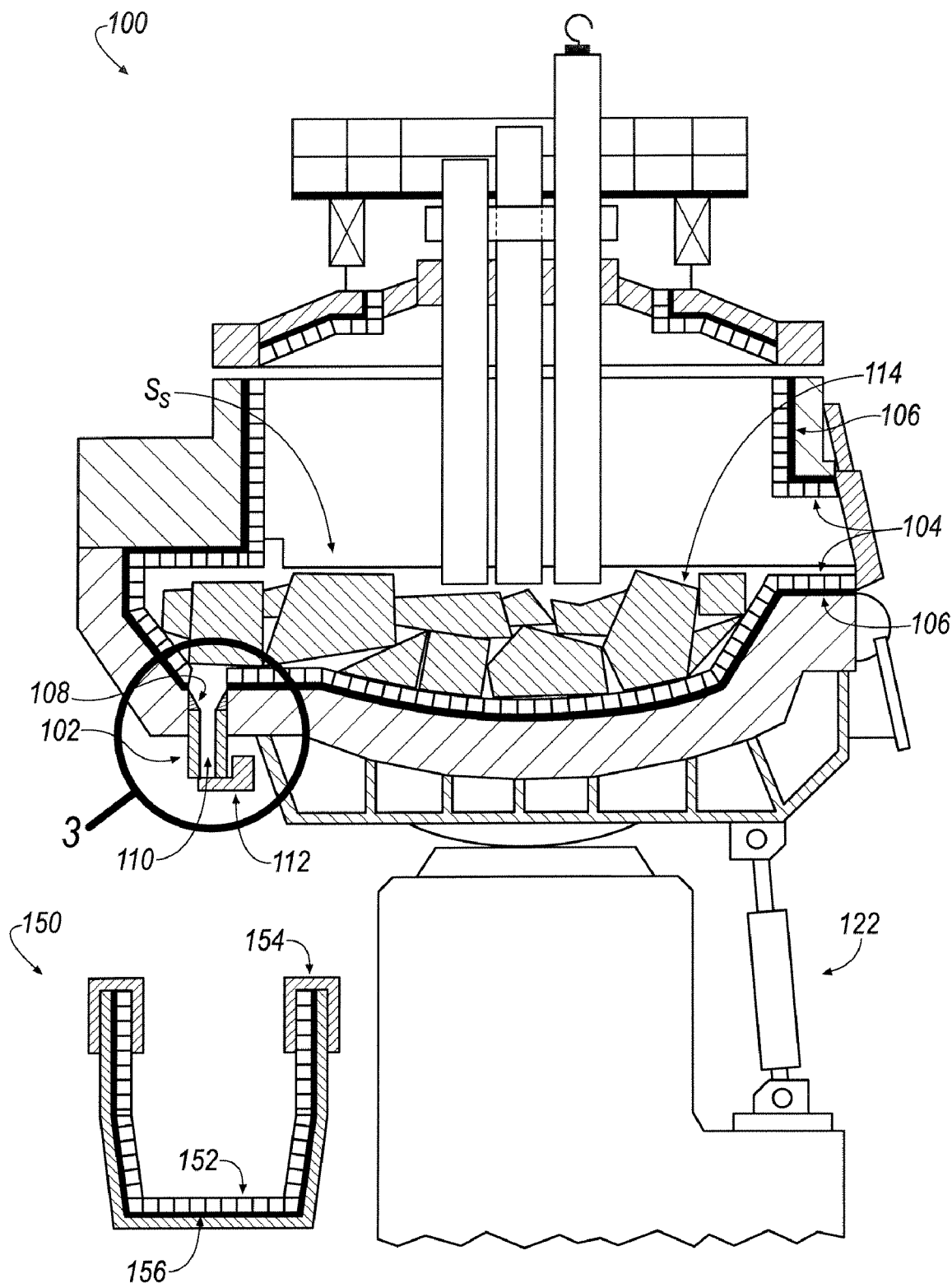
FIG. 2 is a side, partial cross-sectional view of an electric arc furnace in accordance with an embodiment of the invention.

In an embodiment, the taphole fill material, F, may be interfaced with a portion of an EAF 100 (see, e.g., FIG. 2), such as, for example, a taphole cylinder 102 of the EAF 100. As will be described in the foregoing disclosure, the EAF 100 may be utilized to process substantially solid steel material, $S_S$ (see, e.g., FIGS. 2 and 3B-3C), into a substantially liquid steel material, $S_L$ (see, e.g., FIGS. 3C-3G). In an embodiment, the substantially solid steel material, $S_S$, may include, for example, scrap metal or other iron units, such as, for example, direct-reduced iron or the like.

In an embodiment, the EAF 100 functionally heats and subsequently melts the substantially solid steel material, $S_S$ (i.e., upon heating the substantially solid steel material, the steel material is re-orientated from a substantially solid state to a substantially liquid state). Because the substantially solid steel material, $S_S$, is heated to substantially high temperatures (e.g., 3000° F.), most impurities of the substantially solid steel material, $S_S$, may be removed therefrom.

In an embodiment, the substantially liquid steel material, $S_L$, may be later evacuated from the EAF 100 (see, e.g., FIGS. 3F-3G) and into an EAF ladle 150 (see, e.g., FIG. 2) by way of the taphole cylinder 102. As will be described in the foregoing disclosure, the taphole fill material, F, may selectively impede evacuation of the substantially liquid steel material, $S_L$ (see, e.g., FIGS. 3C-3E), from the EAF 100 and into the ladle 150 until structure (e.g., a stopper gate 112) of the EAF 100 is selectively manipulated by one or more of an operator or controller. After being deposited into the ladle 150, the substantially liquid steel material, $S_L$, may be subsequently formed into any desirable steel-based component.

In an embodiment, referring to step S10.1 of FIG. 1, the taphole fill material, F, may include spent/used/recycled alumina refractory material that may be recovered from one or more sources. In an embodiment, referring to FIG. 2, the recovered material may originate from one or more sources including, for example, spent/used/recycled alumina-magnesium-carbon (AMC) liner bricks 104, 152 of one or more of an EAF 100 and a ladle 150. In an embodiment, the AMC liner bricks 104, 152 may include, but is not limited to: burned bauxite, fused bauxite, small amounts of burned magnesite that may range from, for example, approximately 3% to approximately 20%, spinel (magnesium aluminate), graphite, and carbon binders, such as, for example, resins, or the like. Unless otherwise indicated, all percentage enumerations given herein are by percentage weight.

In an embodiment, the recovered material may also originate from a spent/used/recycled a "high-alumina"/"white alumina" material defining a castable shape, such as, for example, a top lip ring 154 of the ladle 150. In an embodiment, other "high-alumina"/"white alumina" castable shapes may include, for example, porous plug blocks, well blocks, breast blocks and the like. In an embodiment, the alumina purity of "high-alumina"/"white alumina" material may range from about 70% to 95% alumina content.

In an embodiment, the recovered material may also originate from a spent/used/recycled fused-grain alumina material defining a pre-cast bottom-wall/side-wall liner 106, 156 of one or more of the EAF 100 and the ladle 150. In an embodiment, fused-grain alumina may include approximately 60% to approximately 75% alumina, or, alternatively, approximately 70% to approximately 90% alumina, a small amount of silica, a small amount of one or more binders or the like. In an embodiment, the recovered material may also originate from a spent/used/recycled fused-grain alumina material defining a furnace delta 108 of the EAF 100.

Although several sources for the recovered material may include one or more of a spent/used/recyclable liner bricks 104, 152, lip rings 154, liners 106, 156 and deltas 108, it will be appreciated that the invention is not limited to the above sources for the recovered material. Further, although several material compositions including one or more of an alumina-magnesium-carbon material, a "high-alumina"/"white alumina" material and a fused-grain alumina material are described above, it will be appreciated that the taphole fill material, F, is not limited to including a particular spent/used/recyclable refractory material or spent/used/recyclable refractory material composition and that the invention may be practiced utilizing any desirable spent/used/recyclable refractory material or spent/used/recyclable refractory material composition.

Further, in an embodiment, it will be appreciated that the taphole fill material, F, is not limited to including 100% spent/used/recyclable refractory material. For example, in an embodiment, the taphole fill material, F, may include, for example, a first portion including spent/used/recyclable refractory material and a second portion including an unspent/unused, virgin refractory material, such as, for example, virgin alumina-magnesium-carbon material, a virgin "high-alumina"/white alumina material, a virgin fused-grain alumina material or the like. Although a virgin refractory material may be utilized to provide the taphole fill material, F, it will be appreciated that by utilizing a spent/used/recyclable refractory material, landfill waste may be reduced by providing the disclosed, novel application of the spent/used/recyclable refractory material as at least a portion of a novel taphole fill material, F. Further, it will be appreciated that, if, for example, the fill material, F, includes 100%, or, a greater amount of virgin refractory material when compared to a recovered spent/used/recyclable refractory material, the cost of the fill material, F, may increase and reduce the profitability and/or cost-effective applicability of the fill material, F.

In an embodiment, once the spent/used/recyclable refractory material is recovered from one or more sources 104-108, 152-156 at step S10.1, the recovered refractory material may be delivered to a processing facility in the form of a plurality of whole or broken pieces. In an embodiment, the whole or broken piece material may be optionally reduced in size to include, for example, small, medium and/or large size particles by way of, for example, a grinding/crushing operation.

In an embodiment, at step S.10.2, the larger particles may be segregated from smaller particles by way of, for example, a screen. After segregating the large and small particles at step S10.2, one or more cross-belt magnets may, for example, be utilized to remove magnetic particles from one or more of the large and small particles at step S10.3. In an embodiment, the magnetic particles may include, for example, steel refuse from prior cycles/usage of one or more of an EAF 100 or ladle 150. Once the magnetic particles are removed, the large and small particles may be further grinded/crushed at step S10.4.

Figure 4:
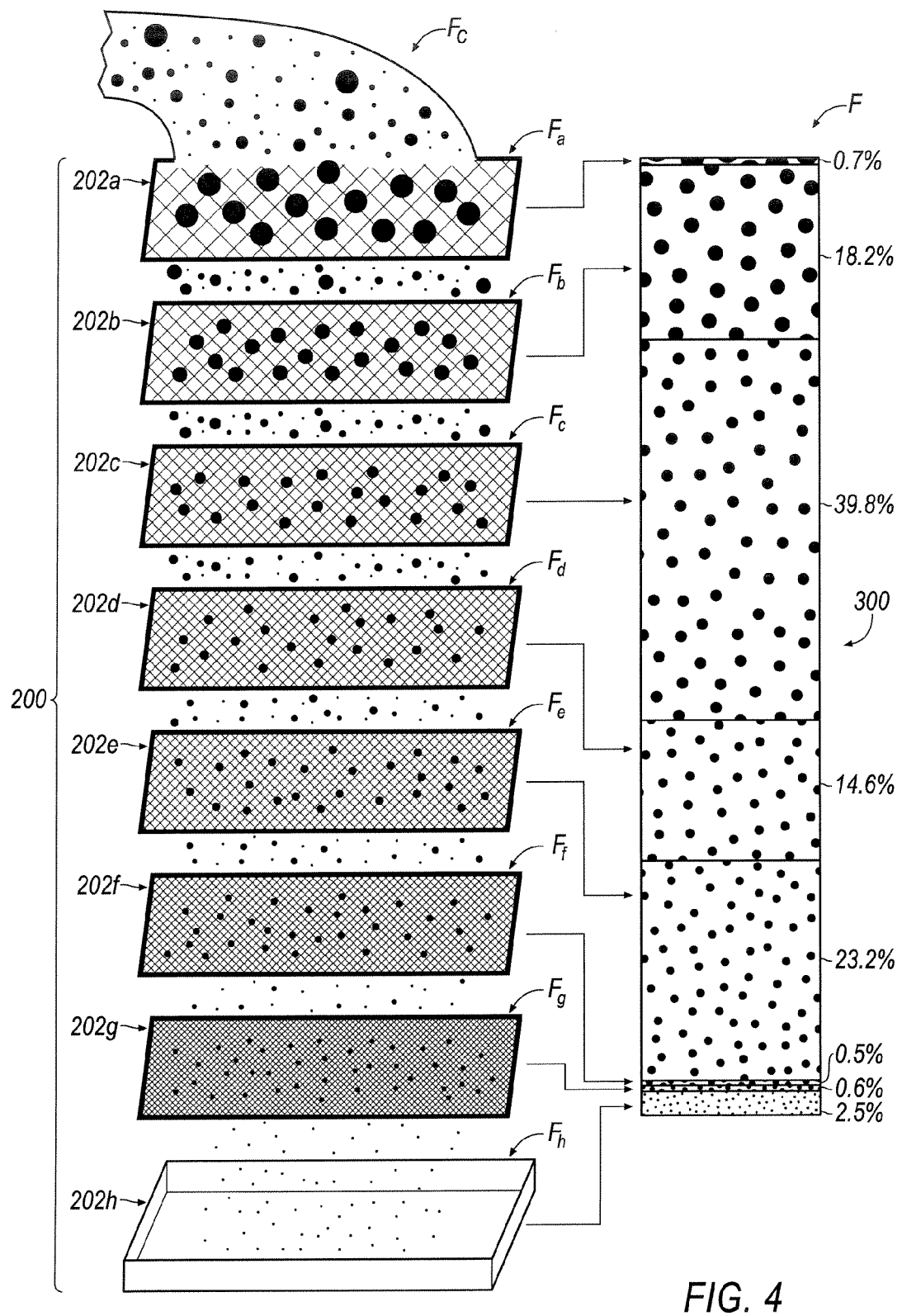
FIG. 4 is a view of an apparatus for preparing the fill material in accordance with an exemplary embodiment of the invention.

At step S10.5, the grinded/crushed large and small particles may be further segregated by way of, for example, one or more screens (see, e.g., FIG. 4). In an embodiment, the one or more screens may pass particles that are less than about, for example, 6 mm×3 mm (i.e., "smaller, crushed particles") and retain particles that are greater than about, for example, 6 mm×3 mm (i.e., "larger, crushed particles"). In an embodiment, at step S10.6, the larger, crushed particles may be optionally further grinded/crushed in order to reduce the larger, crushed particles to be less than about, for example, 6 mm×3 mm.

Although it is described above that one or more screens may pass particles less than about 6 mm×3 mm, it will be appreciated that the fill material, F, of the present invention is not limited to a particular particle size. In an embodiment, the range of the size of the crushed particles of the filler material, F, may be, for example, as small as approximately 1.5875 mm to as large as approximately 9.525 mm. In an embodiment, the sizing of most particles may range between, for example, approximately 3.175 mm and approximately 6.35 mm. Although some under-sized and over-sized particles may be passed by one or more screens, the under-sized or over-sized passed particles should not detract from the performance of the fill material, F, once deposited into the taphole cylinder 102.

At step S10.7, the crushed and/or further crushed particles may be blended by, for example, a blending apparatus (see, e.g., FIG. 4) to provide the fill material, F, in a blended, loose grain/"sandy" form. In an embodiment, the crushed and/or further crushed material may alternatively be blended with a feedstock material (e.g., a virgin/higher alumina purity feedstock material) in order to, for example, reduce or limit the carbon content of the fill material, F, to include about, for example, a maximum of 4% by weight carbon content. In an embodiment, reduction of the carbon content will allow control over a finished steel product's final physical properties (e.g., ductility, tensility, and the like).

Figure 3A:
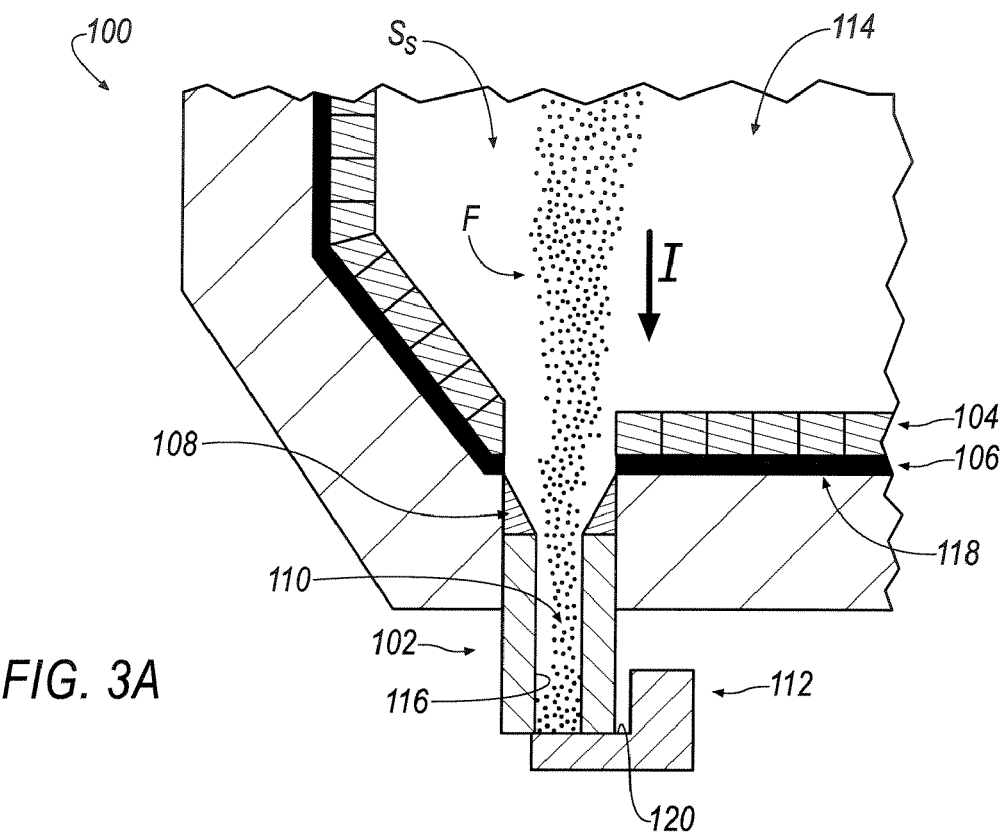
FIGS. 3A-3G illustrate a method for utilizing a taphole fill material in conjunction with the operation of an electric arc furnace in accordance with an exemplary embodiment of the invention.

Referring to FIG. 3A, in an embodiment, a stopper gate 112 of the EAH 100 may be initially arranged in a closed orientation such that the blended, loose grain/"sandy" fill material, F, may be deposited according to the direction of the arrow, I, within an opening/passage 110 extending through the taphole cylinder 102. As such, the blended, loose grain/"sandy" fill material, F, may be deposited into the opening/passage 110 from within a cavity 114 of the EAF 100.

Figure 3B:
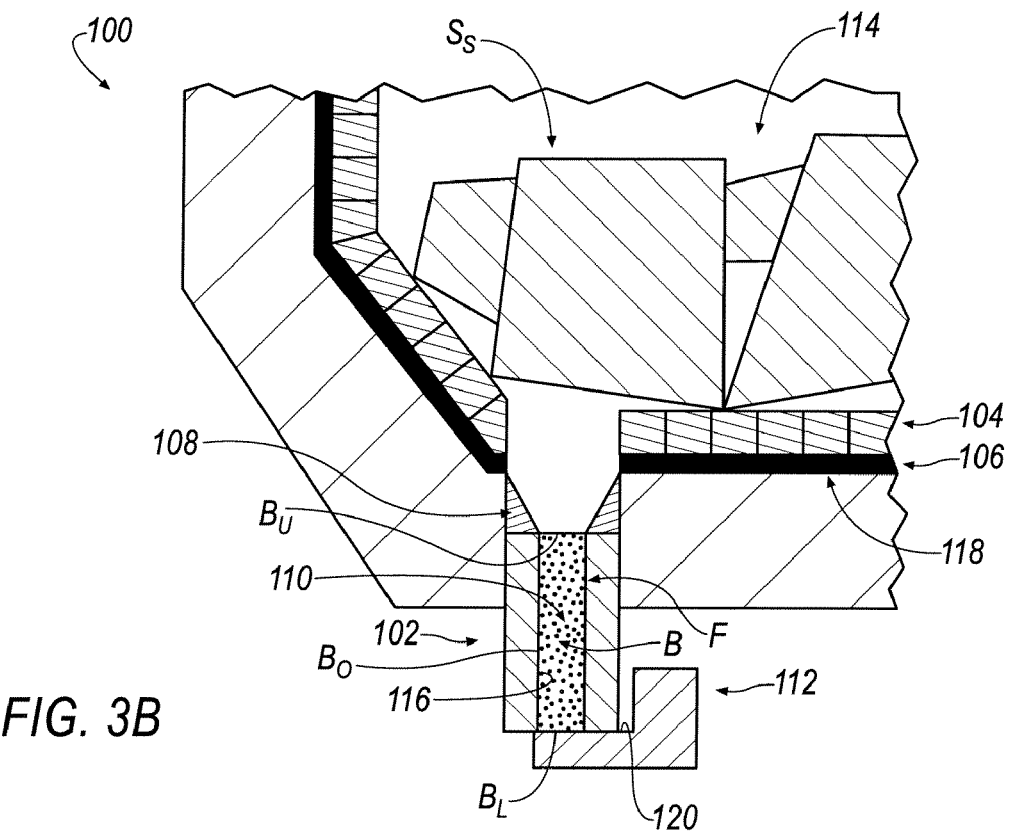

As seen in FIG. 3B, once the blended, loose grain/"sandy" fill material, F, is deposited within the opening/passage 110, the blended, loose grain/"sandy" fill material, F, may conform to the shape of the opening/passage 110 to generally define a body, B, of fill material, F, including an outer surface, $B_O$, an upper surface, $B_U$, and a lower surface, $B_L$. In an embodiment, the outer surface, $B_O$, may be disposed substantially adjacent an inner surface 116 of the taphole cylinder 102. Further, in an embodiment, the upper surface, $B_U$, may comprise a portion of a bottom surface 118 of the cavity 114 of the EAF 100. Further, in an embodiment, the lower surface, $B_L$, of the may be disposed substantially adjacent an upper surface 120 of the stopper gate 112. Further, in an embodiment, it will be appreciated that the upper surface 120 of the stopper gate 112 may support the fill material, F, and/or prevent the fill material, F, from prematurely discharging out of the opening/passage 110.

Figure 3C:
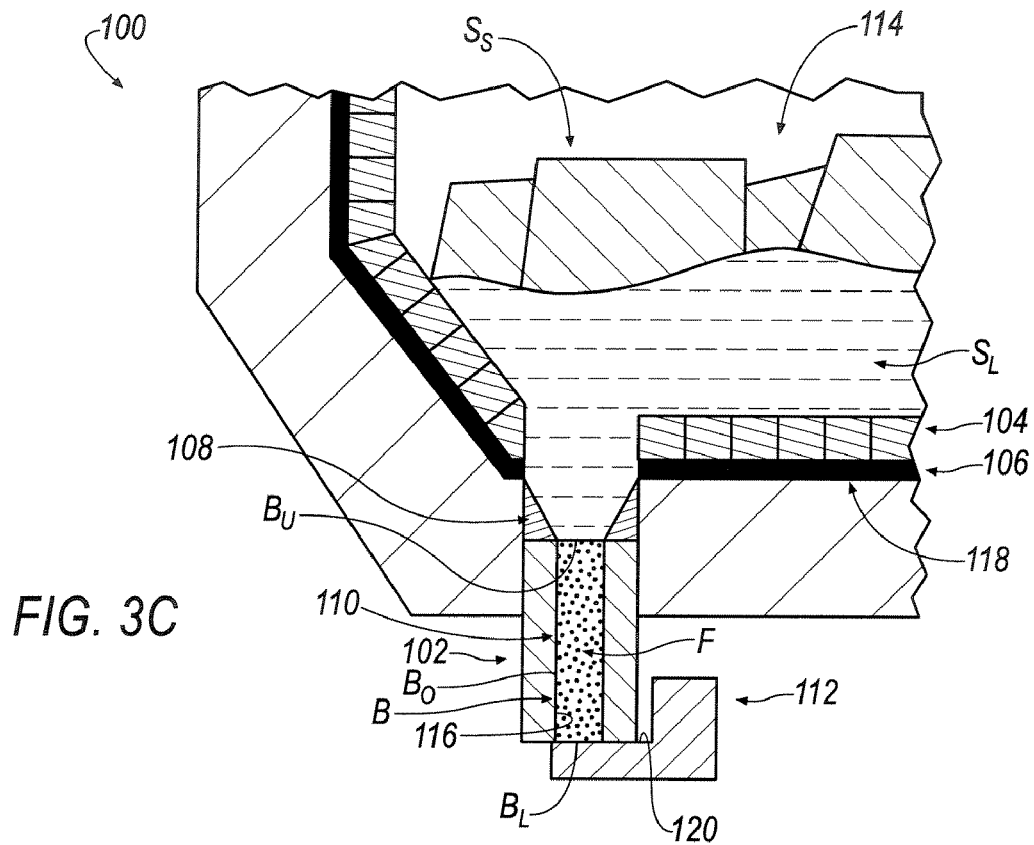

Referring to FIG. 3B-3C, after disposing the fill material, F, within the opening/passage 110, the substantially solid steel material, $S_S$, may be deposited into the cavity 114 of the EAF 100 such that a heating and melting operation of the EAF 100 may be commenced to change the substantially solid steel material, $S_S$, to the substantially liquid steel material, $S_L$. As the substantially solid steel material, $S_S$, is changed to the substantially liquid steel material, $S_L$, the substantially high temperatures of the substantially liquid steel material, $S_L$, may cause the upper surface, $B_U$, of the body, B, to be sintered/cauterize and at least partially bond to the substantially liquid steel material, $S_L$, which is shown generally at $B_{UC}$ in FIG. 3D.

Figure 3D:
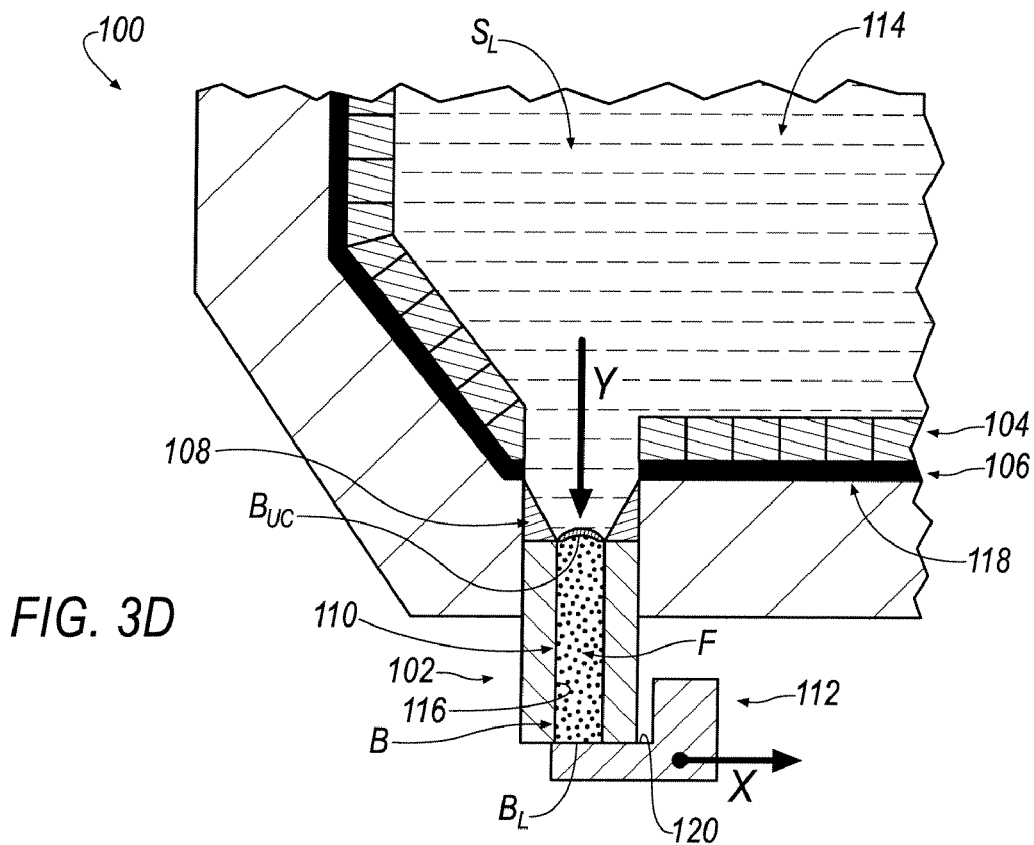
Figure 3E:
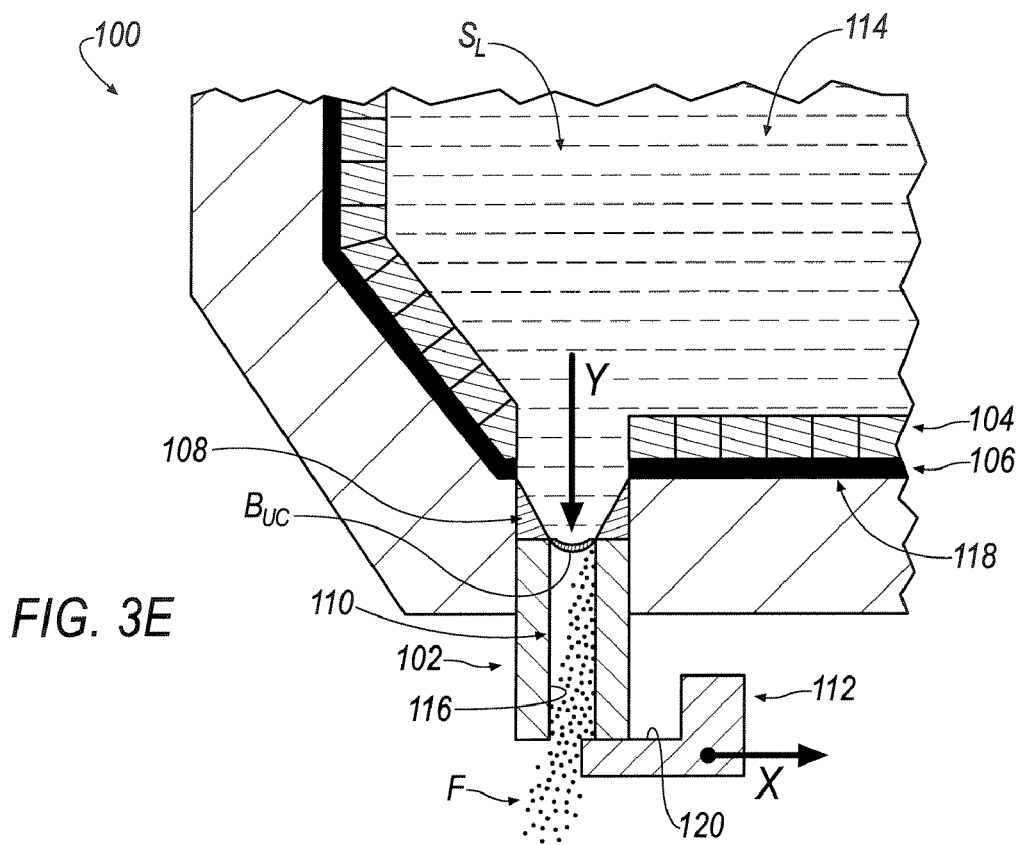

Referring to FIG. 3D, once it has been determined by one or more of an operator or controller that the substantially solid steel material, $S_S$, has been changed to the substantially liquid steel material, $S_L$, and/or an amount of impurities has been removed from the substantially liquid steel material, $S_L$, one or more of the operator and controller may cause the stopper gate 112 to move from the closed orientation to an opened orientation according to the direction of the arrow, X. As seen in FIG. 3E, the movement of the stopper gate 112 according to the direction of the arrow, X, may permit the blended, loose grain/"sandy" fill material, F, to discharge from the opening/passage 110.

In an embodiment, the discharging of the blended, loose grain/"sandy" fill material, F, is generally permitted by gravity. Further, in an embodiment, a force imparted by the substantially liquid steel material, $S_L$, to the blended, loose grain/"sandy" fill material, F, according to the direction of the arrow, Y (see, e.g., FIGS. 3D-3F), may result in the substantially liquid steel material, $S_L$, pushing the blended, loose grain/"sandy" fill material, F, out of the opening/passage 110 upon moving the stopper gate 112 to the opened orientation.

Figure 3F:
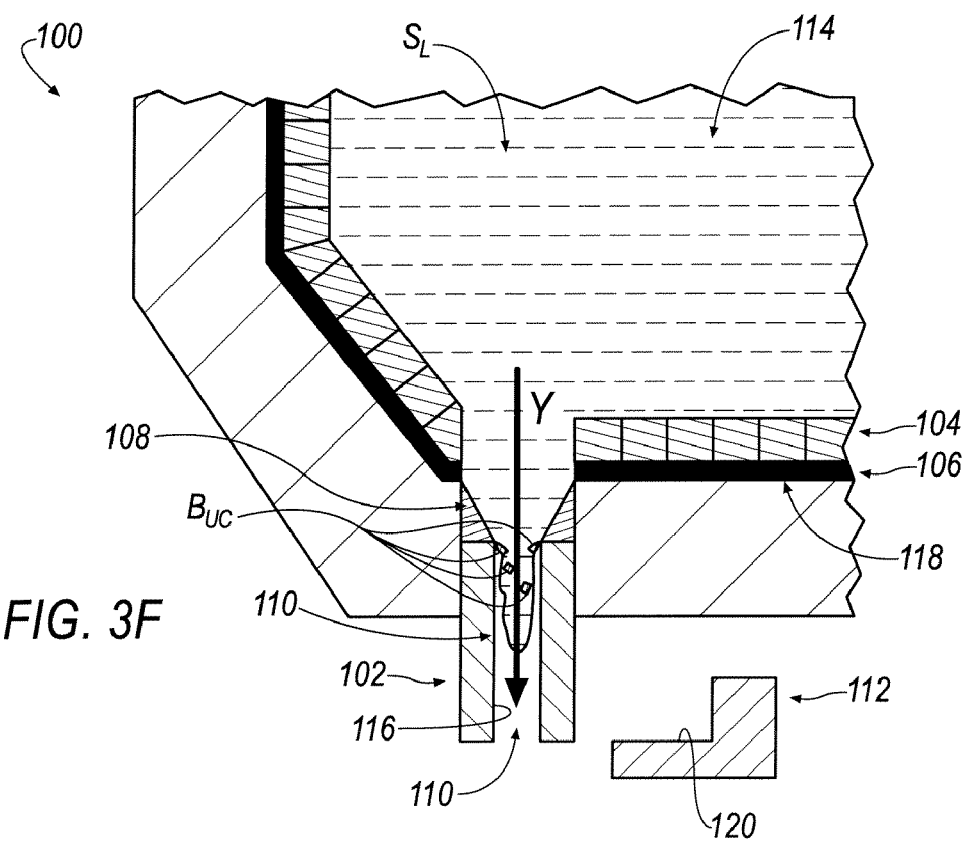
Figure 3G:
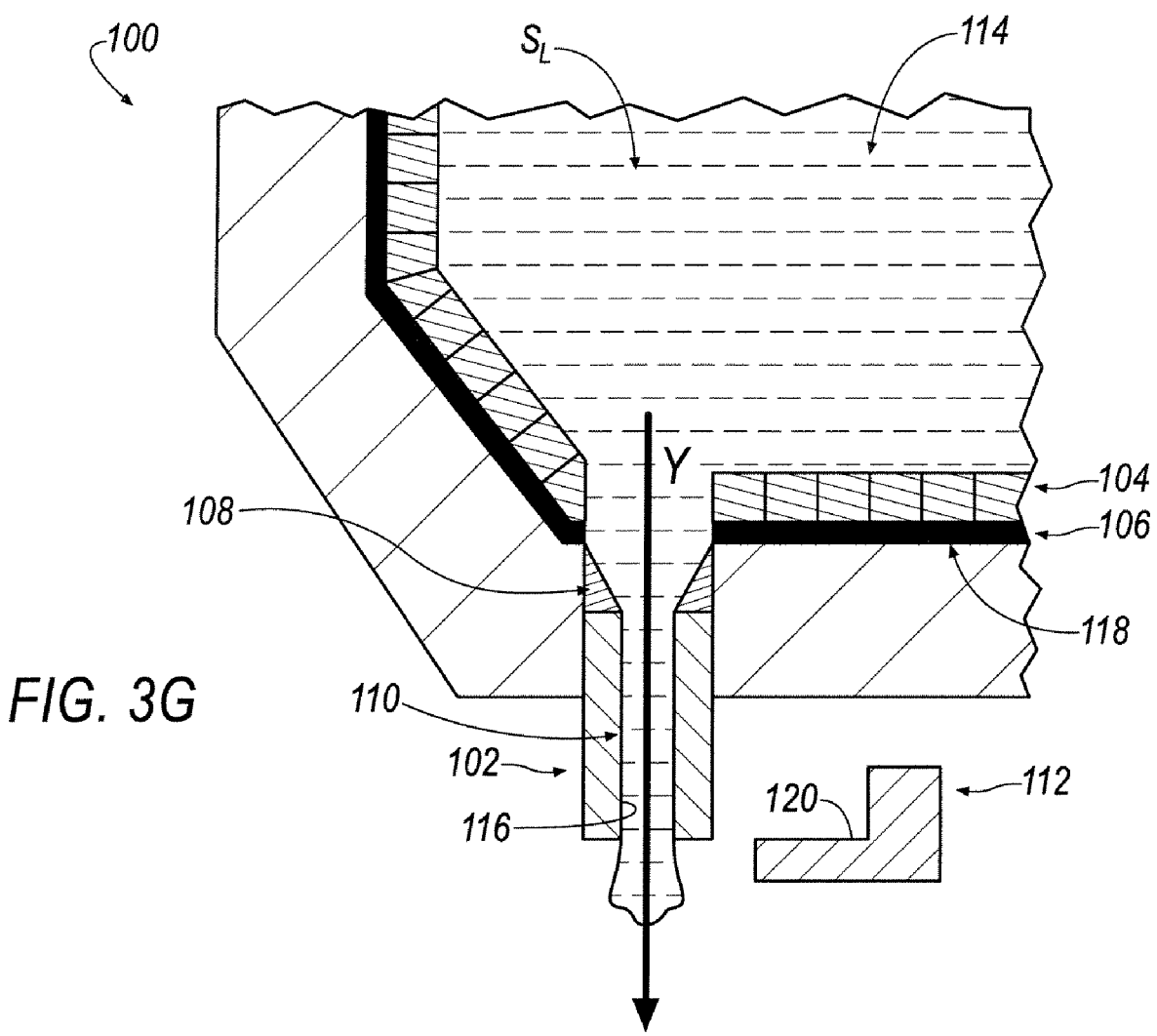

Referring to FIGS. 3F-3G, in an embodiment, during and/or after the discharging of the blended, loose grain/"sandy" fill material, F, from the opening/passage 110, the substantially liquid steel material, $S_L$, may be evacuated from the EAF 100 and into the ladle 150 by way of the taphole cylinder 102. In an embodiment, as seen in FIG. 3F, it will be appreciated that some of the cauterized upper surface, $B_{UC}$, of the body, B, may not be fully discharged prior to the evacuation of the substantially liquid steel material, $S_L$, into the ladle 150, and, as such, some of the cauterized upper surface, $B_{UC}$, of the body, B, may revert into the substantially liquid steel material, $S_L$, as it is being evacuated into the ladle 150.

In an embodiment, the fill material, F, associated with the operation of the EAF 100 that is described above in FIGS. 3A-3G may include one or more requisite chemical and physical properties associated with the operation of the EAF 100. As such, it will be appreciated that the fill material, F, may function by not only providing a physical plug within the opening/passage 110 of the taphole cylinder 102 while melt operations are being preformed by the EAF 100, but, also, the fill material, F, should also be permitted to be easy removed during the discharge phase of the substantially liquid steel material, $S_L$, so as to not impart deleterious chemical pickup to the resultant substantially liquid steel material, $S_L$, provided into the ladle 150. Accordingly, the foregoing description discusses several areas of consideration that may be related to an acceptable steel-based product and/or optimized operation of the EAF 100.

A first area of consideration may include, for example, the life of the taphole cylinder 102. The taphole cylinder 102 may be a cylindrical refractory tube that is typically made from alumina and/or graphite that is positioned in the eccentric-bottom-tap (EBT) section of the EAF 100, running substantially vertically through a bottom portion of the EAF 100. As shown in FIGS. 3F-3G above, the taphole cylinder 102 may be used to drain the EAF 100 of the substantially liquid steel material, $S_L$, once the melting process of the substantially solid steel material, $S_S$, is completed.

In an embodiment, the taphole cylinder 102 may be typically replaced every one-hundred to one-hundred-and-fifty uses/cycles of the EAF 100. Usually, the process for replacing the taphole cylinder 102 may take about a half-hour to one-and-a-half hours of labor-intensive work. Accordingly, upon considering the teachings of the present disclosure, it will be appreciated that one or more compositions of the fill material, F, proposed by the present disclosure may not only render a cost savings to an owner/operator of the EAF 100, but, also, the fill material, F, may also reduce the mean time between replacements of the taphole cylinder 102 and therefore realize a cost savings to the owner/operator of the EAF 100.

In an embodiment, the fill material, F, of the present invention may achieve increased life of the taphole cylinder 102 by providing the fill material in the form of small-grained magnesium-oxide (MgO) particles that bond with molten iron-oxide (FeO) in the substantially liquid steel material, $S_L$, as it runs through the opening/passage 110 of the taphole cylinder 102. Accordingly, in an embodiment, the blended, loose grain/"sandy" fill material, F, may provide a coating on the inner surface 116 of the taphole cylinder 102 that provides the taphole cylinder 102 with a temperature-resistant feature.

Through experimentation, trials of a variety of blended, loose grain/"sandy" fill material compositions used with an EAF 100 has demonstrated increased mean time between tap hole replacements of approximately 30% to 100% over prolonged testing periods.

Another area of consideration may include, for example, the "free open" state of the taphole cylinder 102. In an embodiment "free open" may generally mean that the substantially liquid steel material, $S_L$, flows from the EAF 100 without any form of assistance of an operator (e.g. the operator 'lancing' or digging-out the cauterized portion, $B_{UC}$, in order to induce flow of the substantially liquid steel material, $S_L$, into the ladle 150.

In an embodiment, when the stopper gate 112 is moved to the opened orientation, "free open" may be achieved as the non-sintered/-cauterized grains of the fill material, F, discharge from the taphole cylinder 102 with the assistance of gravity while leaving the sintered/cauterized portion, $B_{UC}$, within the opening/passage 110. In an embodiment, the ferro-static pressure arising from the substantially liquid steel material, $S_L$, within the cavity 114 should cause the sintered/cauterized portion, $B_{UC}$, to subsequently break, thereby providing a substantially immediate "free open" state of the taphole cylinder 102 as the stopper gate 112 is moved to an open orientation and/or as the EAF 100 is tilted by, for example, a hydraulic rocking cylinder 122 (see, e.g., FIG. 2).

Accordingly, one or more of the movement of the stopper gate 112 and the tilting of the EAF 100 may allow the substantially liquid steel material, $S_L$, to be poured out of the EAF 100 without the further physical aid of a person/operator that may, for example, lance or dig-out the sintered/cauterized portion, $B_{UC}$. Accordingly, it will be appreciated that the lancing and/or digging-out of the sintered/cauterized portion, $B_{UC}$, may otherwise act as a negative impact on productivity of the EAF 100 by not providing the EAF 100 with a consistent "free open" state for repeated cycles of the EAF 100. Through experimentation, trials of a variety of blended, loose grain/"sandy" fill material compositions used with an EAF 100 has demonstrated "free open" metrics of approximately 95% to 100% over prolonged testing periods.

Another area of consideration may include, for example, "silica reversion." In an embodiment, the substantially liquid steel material, $S_L$, may be formed into a final product that includes, for example, sheet steel that may have one or more grades of low silicon steel. In an embodiment, low silicon steel may be very low in oxygen and go through a vacuum degasser while having the potential to re-assimilate silicon.

In an embodiment, conventional fill materials may contain higher levels of silicon (e.g., approximately 60% to 80%), and, as such, have demonstrated that the steel end product may have an increased amount of silica, thereby negatively impacting the quality of the end product. Accordingly, it will be appreciated that the blended, loose grain/"sandy" fill material, F, of the present invention may provide an improvement over conventional fill materials due to the fact that the blended, loose grain/"sandy" fill material, F, of the present invention may have less than approximately 10% silica, thereby reducing, if not eliminating the potential for silicon reversion into the substantially liquid steel material, $S_L$, as the substantially liquid steel material, $S_L$, is evacuated from the EAF 100 and into the ladle 150.

Another area of consideration may include, for example, the minimization of waste. As indicated above, the fill material, F, may include spent/used/recyclable refractory material recovered from one or more sources 104-108, 152-156. When EAFs 100 and/or ladles 150 are subjected to regular service/maintenance procedures, such sources 104-108, 152-156 are typically discarded and are transported to a landfill. Thus, it will be appreciated that such materials may not be immediately sent to a landfill as the owner/operator of an EAF 100 may utilize such spent/used refractory materials as a valuable resource that not only may increase profits and performance of the EAF 100, but may also output an improved steel end-product that includes less silicon.

Through experimentation, three separate blended, loose grain/"sandy" fill materials, F, and three separate EAFs 100 at three different manufacturing sites provided the following results. In a first trial at a first manufacturing site, a first EAF 100 was cycled thirty times, by utilizing a blended, loose grain/"sandy" fill material, F, defined by 10% "white alumina castable shapes, 60% AMC brick and 30% white alumina deltas, bottom wall/side-wall liners and the like achieving 100% "free open" for every cycle as well as a lower silica content (e.g., the fill material, F, included a certified content having less than 10% silica). In a second trial at a second manufacturing site, a second EAF 100 was cycled five-hundred times, by utilizing a blended, loose grain/"sandy" fill material, F, defined by 10% "white alumina castable shapes, 60% AMC brick and 30% white alumina deltas, bottom wall/side-wall liners and the like achieving "free open" for 96% of the five-hundred cycles as well as a 0.0002 parts-per-million reduction of silica content the substantially liquid steel material, $S_L$, (e.g., the fill material, F, included a certified content having less than 10% silica). In a third trial at a third manufacturing site, a third EAF 100 was cycled two-hundred times, by utilizing a blended, loose grain/"sandy" fill material, F, defined by 10% "white alumina castable shapes, 60% AMC brick and 30% white alumina deltas, bottom wall/side-wall liners and the like achieving "free open" for 97% of the two-hundred cycles as well as a 0.0002 parts-per-million reduction of silica content in the substantially liquid steel material, $S_L$, (e.g., the fill material, F, included a certified content having less than 10% silica). Further, for the third trial, the life of the taphole cylinder 102 was extended from one-hundred cycles to one-hundred-and-eighty cycles on average when compared to usage of conventional fill materials with the third EAF 100.

Figure 5:
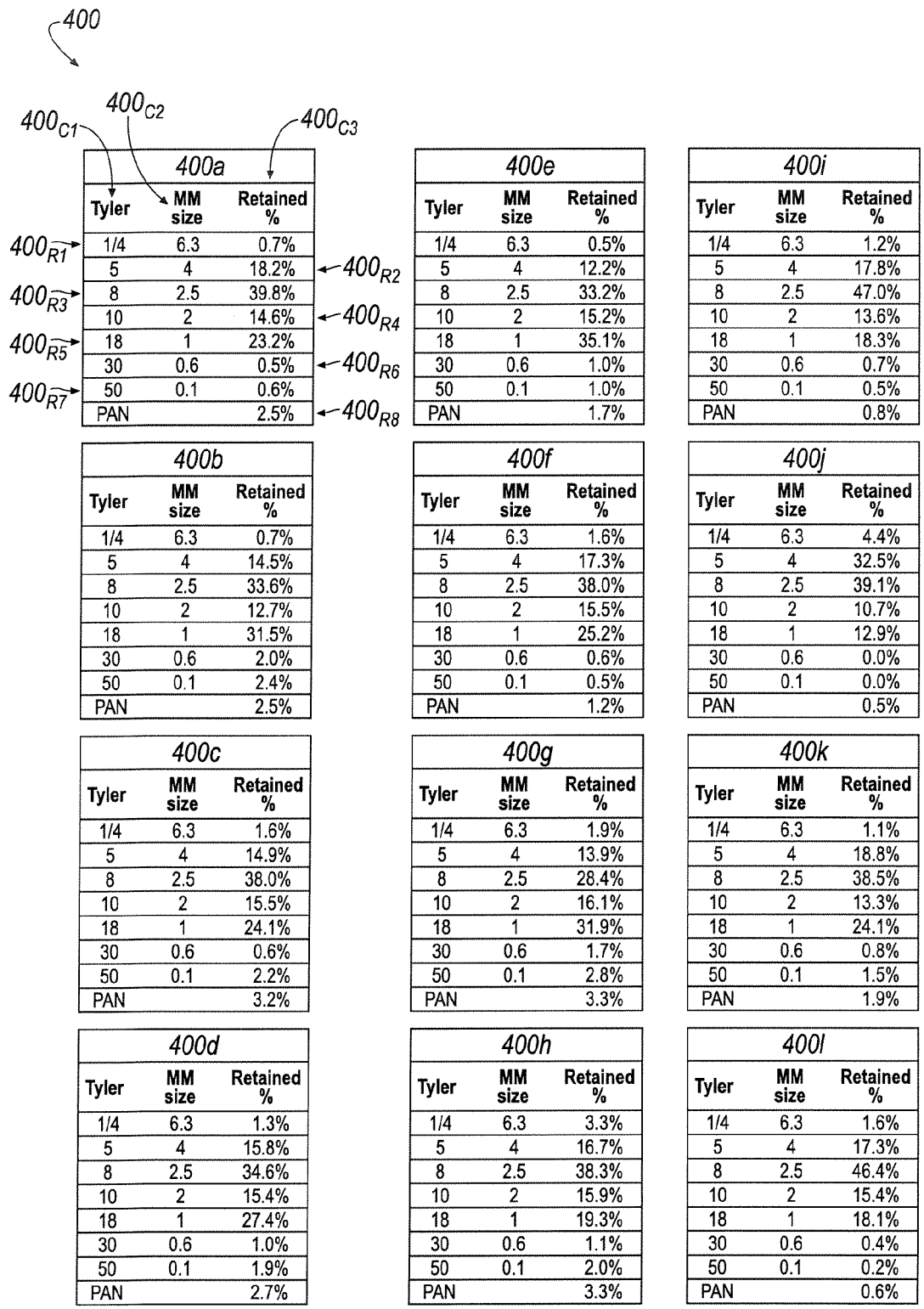
FIG. 5 illustrates a plurality of tables including fill material compositions in accordance with an exemplary embodiment of the invention.

Referring now to FIGS. 4-5 an apparatus and a method is disclosed for preparing the fill material, F, in accordance with an embodiment of the invention. In an embodiment, FIG. 4 illustrates a first apparatus 200 and a second apparatus 300. The operation of each of the apparatuses 200, 300 is described in the foregoing description.

In an embodiment, the apparatus 200 may be generally defined as a segregating device that performs, for example, the segregating step described above at step S10.5. In an embodiment, the apparatus 300 may perform, for example, the blending step described above at step S10.7.

In an embodiment, the apparatus 200 may include, for example, a plurality of tiered, stacked or cascaded segregating devices 202a-202g and a pan, retainer or the like 202h. In an embodiment, the segregating devices 202a-202g may each include a screen mesh or the like in order to separate larger fill material particles, which are shown generally at, $F_a$, from progressively smaller fill material particles, which are shown generally at $F_b$-$F_h$. In an embodiment, the pan 202h catches and retains the smallest fill material particles, $F_h$.

Referring to FIG. 5, a plurality of tables 400 including tables 400a-400l are shown according to an embodiment. Referring to table 400a, several columns $400_{C1}$, $400_{C2}$, $400_{C3}$ are shown and several rows $400_{R1}$, $400_{R2}$, $400_{R3}$, $400_{R4}$, $400_{R5}$, $400_{R6}$, $400_{R7}$, $400_{R8}$, are shown. In an embodiment, columns $400_{C1}$ and $400_{C2}$ relate to a sizing of the screen mesh for each of the plurality of stacked segregating devices 202a-202g. Column $400_{C1}$ is an industry stand "Tyler Mesh Size" and column $400_{C2}$ is the approximate equivalent of the Tyler mesh size in milli-meters (mm). In an embodiment, the opening sizing described in columns $400_{C1}$ and $400_{C2}$ may be related to a square shape screen mesh opening (e.g., 6.3 $mm^2$); however, it will be appreciated that the columns $400_{C1}$ and $400_{C2}$ may relate to any other sizing specification of the mesh screen opening (e.g., a diameter or the like).

In an embodiment, referring to FIG. 4 and table 400a of FIG. 5, as crushed fill material, $F_C$, is initially deposited onto the first segregating device 202a of the plurality of segregating devices 202a-202g. In an embodiment, the first segregating device 202a will retain crushed fill material, $F_a$, that is greater than 6.3 mm and pass crushed fill material, $F_C$, that is less than 6.3 mm. As the crushed fill material, $F_C$, that is less than 6.3 mm comes into contact with the second segregating device 202b, the second segregating device 202b will retain crushed fill material, $F_b$, that is greater than 4.0 mm and pass crushed fill material, $F_C$, that is less than 4.0 mm. As the crushed fill material, $F_C$, is passed through the following segregating devices 202c-202g, a substantially similar sorting procedure is performed as described above such that each of the following segregating devices 202c-202g will retain/pass crushed fill material, $F_C$, according to the screen mesh openings of 2.5 mm, 2.0 mm, 1.0 mm, 0.6 mm and 0.1 mm.

Referring to FIG. 4, once the crushed fill material, $F_C$, is segregated as described above, an amount of each of the segregated fill material, $F_a$-$F_h$, located within each of the plurality of stacked segregating devices 202a-202g and pan 202h, may be retrieved and deposited into the apparatus 300. In an embodiment, the apparatus 300 may include a blending device, mixer or the like that agitates the deposited, segregated fill material, $F_a$-$F_h$, retrieved from the plurality of segregating devices 202a-202g and pan 202h such that the differing sizes of the segregated fill material, $F_a$-$F_h$, from the plurality of segregating devices 202a-202g and pan 202h may be distributed as equally as possible in order to provide the fill material, F, into the taphole cylinder 102.

Referring to the apparatus 300 of FIG. 4 and the table 400a of FIG. 5, in an embodiment, column $400_{C3}$ relates to a percent (%), by weight, of an amount of the segregated fill material, $F_a$-$F_h$, located within each of the plurality of stacked segregating devices 202a-202h that may be retrieved and deposited into the apparatus 300. It will be appreciated that the summed total of the retrieved amounts in the column $400_{C3}$ equals 100%.

In reference to table 400a, in an embodiment, the percent, by weight, of the fill material, F, deposited into the apparatus 300 may include the following amounts: 39.8% of the fill material, F, in the apparatus 300 includes fill material, $F_c$, taken from the segregating device 202c, 23.2% of the fill material, F, in the apparatus 300 includes fill material, $F_e$, taken from the segregating device 202e, 18.2% of the fill material, F, in the apparatus 300 includes fill material, $F_b$, taken from the segregating device 202b, 14.6% of the fill material, F, in the apparatus 300 includes fill material, $F_d$, taken from the segregating device 202d, 2.5% of the fill material, F, in the apparatus 300 includes fill material, $F_h$, taken from the pan 202h, 0.7% of the fill material, F, in the apparatus 300 includes fill material, $F_a$, taken from the segregating device 202a, 0.6% of the fill material, F, in the apparatus 300 includes fill material, $F_g$, taken from the segregating device 202g, and 0.5% of the fill material, F, in the apparatus 300 includes fill material, $F_f$, taken from the segregating device 202f.

Although a fill material, F, including amounts of segregated fill material, $F_a$-$F_h$, is described above, it will be appreciated that the invention is not limited to a fill material, F, including amounts of segregated fill material, $F_a$-$F_h$, described at table 400a in FIG. 5. For example, FIG. 5 also describes tables 400b-400l that also include fill materials, F, having different amounts of segregated fill material, $F_a$-$F_h$. As such, it will be appreciated that the fill material, F, may be composed of approximately the following ranges (in percent by weight) including: 0.5%-10% fill material, $F_a$, 2%-20% fill material, $F_b$, 10%-40% fill material, $F_c$, 10%-60% fill material, $F_d$, 10%-50% fill material, $F_e$, 0.5%-5% fill material, $F_f$, 0.5%-5% fill material, $F_g$, and 0.5%-5% fill material, $F_h$. Further, it will be appreciated that a retrieved amount from the ranges above may not necessarily include a predominant amount of larger fill material, $F_a$-$F_d$, or a predominant amount of smaller fill material, $F_e$-$F_h$, because, in an embodiment, a predominant amount of larger fill material, $F_a$-$F_d$, may permit the substantially liquid steel material, $S_L$, to seep through the fill material, F, whereas a predominant amount of the smaller fill material, $F_e$-$F_h$, may not provide adequate support of the substantially liquid steel material, $S_L$, when the stopper gate is opened. Further, although tables 400a-400l disclose similar screen mesh opening sizes at columns $400_{C1}$, $400_{C2}$, it will be appreciated that the invention is not limited to a particular screen mesh opening size for each of the plurality of segregating devices 202a-202g and pan 202h.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method, comprising the steps of:
    recovering alumina-based refractory waste material from one or more of:
        a serviced electric arc furnace, and
        a serviced electric arc furnace ladle;
    processing the alumina-based refractory waste material;
    disposing the alumina-based refractory waste material obtained from the processing step into a taphole of an electric arc furnace in order to utilize the alumina-based refractory waste material from the processing step as a high-temperature, heat-resistant fill material within the taphole of the electric arc furnace.

2. The method according to claim 1, wherein the alumina-based refractory waste includes one or more of a used alumina-magnesium-carbon material, a used high-alumina material and a used fused-grain alumina material.

3. The method according to claim 1, wherein the processing step includes the steps of:
    removing magnetic material from the recovered alumina-based refractory waste material;
    crushing the recovered alumina-based refractory waste material; and
    screening the recovered alumina-based refractory waste material.

4. The method according to claim 3, wherein the screening step includes:
    passing the crushed, recovered alumina-based refractory waste material that is less than a geometrical shape having a first size, and
    retaining the crushed, recovered alumina-based refractory waste material that is geometrically larger than the first size.

5. The method according to claim 4, wherein the screening includes the steps of:
    further crushing the crushed, recovered alumina-based refractory waste material that is geometrically larger than the first size; and
    blending the further crushed alumina-based refractory waste material with the crushed, recovered alumina-based refractory waste material that is less than the geometrical shape having the first size.

6. The method according to claim 3 further comprising the step of:
    blending the crushed, recovered alumina-based refractory waste material with a virgin refractory material.

7. The method according to claim 3, wherein the screening step includes:
    sorting the alumina-based refractory waste material into at least two groups.

8. The method according to claim 7, wherein the at least two groups includes eight groups,
    wherein a first group of the eight groups includes a first class of alumina-based refractory waste material having a size approximately equal to or greater than 6.3 mm,
    wherein a second group of the eight groups includes a second class alumina-based refractory waste material having a size approximately less than 6.3 mm or greater than 4.0 mm,
    wherein a third group of the eight groups includes a third class alumina-based refractory waste material having a size approximately less than 4.0 mm or greater than 2.5 mm,
    wherein a fourth group of the eight groups includes a fourth class alumina-based refractory waste material having a size approximately less than 2.5 mm or greater than 2.0 mm,
    wherein a fifth group of the eight groups includes a fifth class alumina-based refractory waste material having a size approximately less than 2.0 mm or greater than 1.0 mm,
    wherein a sixth group of the eight groups includes a sixth class alumina-based refractory waste material having a size approximately less than 1.0 mm or greater than 0.6 mm,
    wherein a seventh group of the eight groups includes a seventh class alumina-based refractory waste material having a size approximately less than 0.6 mm or greater than 0.1 mm, and
    wherein an eighth group of the eight groups includes an eighth class alumina-based refractory waste material having a size approximately less than 0.1 mm.

9. The method according to claim 8, further comprising the step of:
    creating a taphole fill material by retrieving an amount of each of the first through eight classes of alumina-based refractory waste material.

10. The method according to claim 9, wherein the retrieved amount of each of the first through eight classes of alumina-based refractory waste material includes a percentage by weight.

11. The method according to claim 10, wherein the retrieved amount of,
    the first class of alumina-based refractory waste material includes a first portion by weight ranging between approximately 0.5% to 10%, wherein the second class of alumina-based refractory waste material includes a second portion by weight ranging between approximately 2% to 20%, wherein the third class of alumina-based refractory waste material includes a third portion by weight ranging between approximately 10% to 40%, wherein the fourth class of alumina-based refractory waste material includes a fourth portion by weight ranging between approximately 10% to 60%, wherein the fifth class of alumina-based refractory waste material includes a fifth portion by weight ranging between approximately 10% to 50%, wherein the sixth class of alumina-based refractory waste material includes a sixth portion by weight ranging between approximately 0.5% to 5%, wherein the seventh class of alumina-based refractory waste material includes a seventh portion by weight ranging between approximately 0.5% to 5%, and wherein the eighth class of alumina-based refractory waste material includes an eighth portion by weight ranging between approximately 0.5% to 5%, wherein a total retrieved amount of the first through eighth portion by weight equal 100%.

* * * * *

UNITED STATES PATENT AND TRADEMARK OFFICE
CERTIFICATE OF CORRECTION

| | | |
|---|---|---|
| PATENT NO. | : 8,062,577 B2 | Page 1 of 1 |
| APPLICATION NO. | : 12/421801 | |
| DATED | : November 22, 2011 | |
| INVENTOR(S) | : Thomas M. Dunn | |

It is certified that error appears in the above-identified patent and that said Letters Patent is hereby corrected as shown below:

On the Title page and Column 1, line 1:

In the Title:

Delete "Alumina" from the title of the invention. The title should read --Taphold Fill Material and Method for Manufacturing--.

Signed and Sealed this
Twenty-eighth Day of August, 2012

David J. Kappos
*Director of the United States Patent and Trademark Office*